United States Patent [19]
Ristow et al.

[11] 3,879,991
[45] Apr. 29, 1975

[54] APPARATUS FOR TESTING LOAD BEARING MEMBERS

[75] Inventors: Ulrich Ristow, Neu-Isenburg; Alfred Schneider, Bremen, both of Germany

[73] Assignees: Licentia Patent-Verwaltungs-G.m.b.H., Frankfurt am Main; Ingenieurburo Schneider & Sudhop, Bremen, both of Germany

[22] Filed: Aug. 24, 1973

[21] Appl. No.: 391,054

[30] Foreign Application Priority Data
Aug. 25, 1972 Germany............................ 2241976
Aug. 25, 1972 Germany............................ 7131565

[52] U.S. Cl..................................... 73/95; 73/103
[51] Int. Cl. ............................................. G01n 3/08
[58] Field of Search ............... 73/95, 97, 103, 95.5

[56] References Cited
UNITED STATES PATENTS
2,884,986  5/1959  Heldenbrand ............... 73/97 X
2,893,240  7/1959  Able ............................... 73/95
3,171,277  3/1965  Gloor ............................ 73/103
3,286,515  11/1966  Bendl ......................... 73/103 X Primary Examiner—Jerry W. Myracle
Attorney, Agent, or Firm—Spencer & Kaye

[57] ABSTRACT

For the load testing of load bearing members there is provided an apparatus which has a base frame, a stand connected to the base frame and a carrier beam secured to the stand for movement with respect to the latter. The base frame and the carrier beam are provided with mounting attachments to which the load carrying member to be tested is secured. There is further provided a power mechanism connected between the carrier beam and the stand for urging the carrier beam to change its distance from the base frame, whereby the load bearing member is placed under the test load.

5 Claims, 3 Drawing Figures 3,879,991

APPARATUS FOR TESTING LOAD BEARING MEMBERS

BACKGROUND OF THE INVENTION

Load carrying and load receiving members of the type used for example, in the field of conveyance, such as chains, cables, crane hooks, hangers, girders and the like, have to be periodically submitted to legally prescribed load tests in order to ensure the safety of their operation.

The testing of hangers or girders of complex structure involves time consuming and expensive measures since these load bearing members have to be tested in an assembled condition and, if possible, at the site of their use.

Load tests of the afore-outlined load receiving and load carrying members have heretofore been performed with the aid of determined weights usually constituted by rail bundles, iron blocks or concrete slabs.

In addition to the shipment back and forth of the very substantial weights, lengthy preparations are needed for performing the tests. Thus, in most cases, additional mechanisms have to be provided to ensure a uniform loading of the member to be tested. The attachment and the subsequent removal of the weights is very time-consuming, and is not in a reasonable and economically justified proportion to the duration of the testing operation proper. Thus, for example, the labor involved in the attachment and removal of a test load of 150 tons in connection with the testing of a 120-ton hanger takes approximately 4 days, whereas the testing process proper requires only 2 hours.

If simple load bearing members, such as chains, cables, tie rods and the like, are to be tested, there are for example, stretcher stands required which, because of their bulky structure, are generally not transportable and are not adapted to test large hangers in an assembled condition.

SUMMARY OF THE INVENTION

It is an object of the invention to provide an apparatus for testing load carrying and load receiving members in assembled condition without the use of test weights and crane apparatuses to thus avoid the above-discussed disadvantages involved therein.

This object, and others to become apparent as the specification progresses, is accomplished by the invention, according to which, briefly stated, there is provided an apparatus which has a base frame, a stand connected to the base frame and a carrier beam secured to the stand for movement with respect to the latter. The base frame and the carrier beam are provided with mounting attachments to which the load carrying member to be tested is secured. There is further provided a power mechanism connected between the carrier beam and the stand for urging the carrier beam to change its distance from the base frame, whereby the load bearing member is placed under the test load.

The apparatus is designed to be readily collapsible to permit its easy transportation to and from the location of use.

The advantage of the apparatus according to the invention resides particularly in the fact that most load bearing members that are used in practice can be tested therewith without major preparation and without the use of weights or additional hoisting equipment. The testing can be accomplished in a substantially shorter period of time and with substantially less work input than it has been possible heretofore. Also, the tests can be effected without endangering the environment in any manner.

DESCRIPTION OF THE PREFERRED EMBODIMENTS

Figure 1:
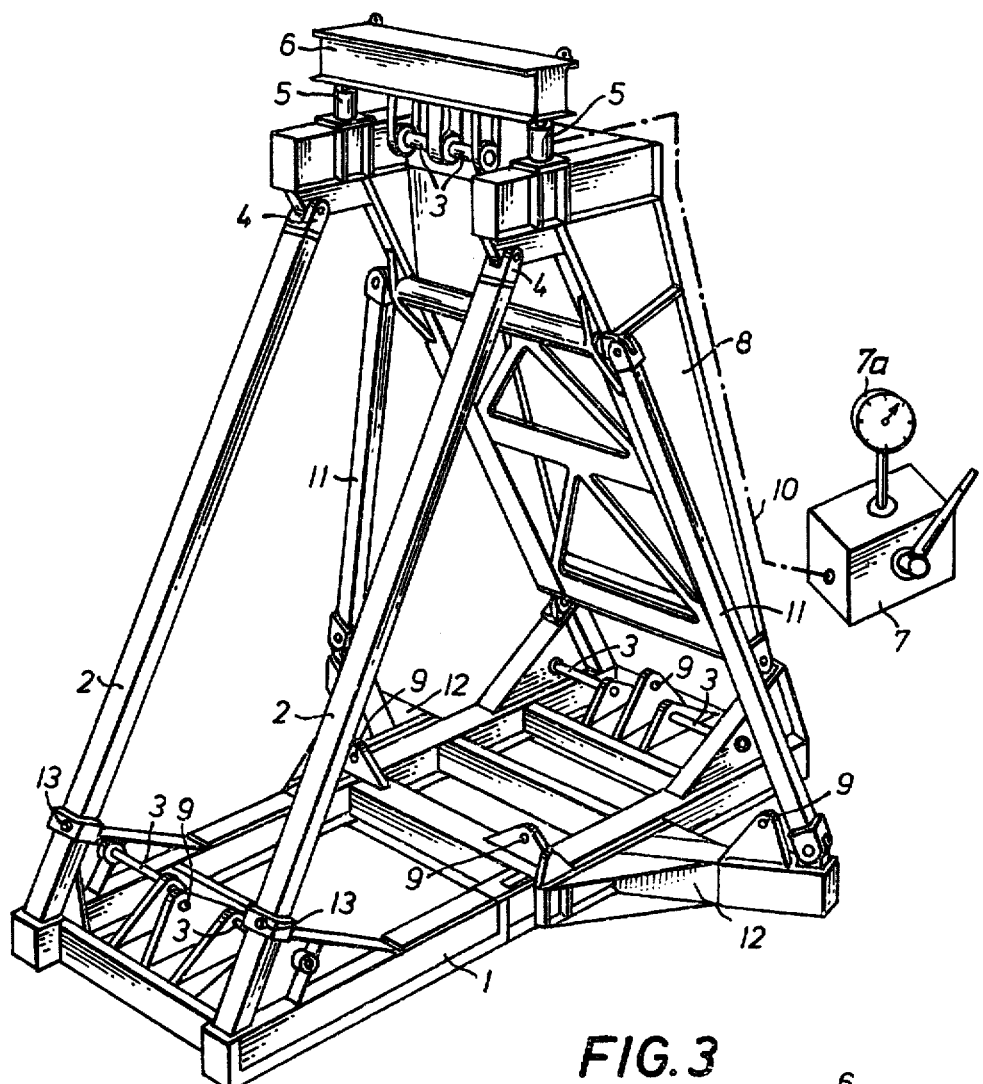
FIG. 1 is a perspective view of a preferred embodiment of the invention in an operational position.

Turning now to FIG. 1, the preferred embodiment illustrated therein is adapted for testing suspensions having two, three, or four arms.

Thus, as it may be also observed in FIG. 1, the stand assembly formed of components 2, 8 is connected, at several spaced locations, to the base frame 1 and constitutes, in the erected position, a rigid, bridge-like structure.

The apparatus comprises a rectangular base frame 1, a collapsible stand 8 pivotally attached to the base frame 1, two collapsible support bars 2, connecting an upper portion of the stand 8 with the frame 1, a carrier beam 6 and a pair of hydraulic or pneumatic cylinders 5, by means of which the beam 6 is supported on the top of the stand 8. Each support bar 2 is pivotally attached by its upper end 4 to the stand 8 and is shackled to the base frame 1 by means of a removable screw connection 13. The apparatus also includes a pressure generating source such as a manual pumping station 7 connected to the power cylinders 5 by means of a pressure fluid conduit 10. The station 7 is provided with a pressure gauge 7a to indicate the force applied to the power cylinders 5. The apparatus further has a plurality of mounting attachments to which the device to be tested is secured. These attachments may be constituted by pins 3 and/or apertured plates 9. In the embodiment illustrated, one set of attachments 3 is affixed to the underside of the carrier beam 6, while several sets of attachments 3, 9 are secured to various locations of the rectangular base frame 1. In case the apparatus is also to be used for testing three-arm hangers then, to the rectangular base frame 1, laterally outwardly extending auxiliary frames 12 are attached, the outer ends of which are connected with an upper portion of the stand 8 by auxiliary support rods 11. Each auxiliary support rod 11 is pivotally connected to the stand 8 and the associated auxiliary frame 12. It is thus seen that by virtue of the auxiliary components 11 and 12, the outline of the base frame is variable. Frames 12 are also provided with mounting attachments 9.

For performing the load testing operation, the hanger to be tested (not shown) is secured by its head to the mounting attachment 3 carried by the beam 6. The other end or ends are secured to one or more mounting attachments 3 and/or 9 disposed on the base frame 1, 12.

Thereafter, the carrier beam 6 is urged to change its distance from the base frame 1, 12 by pressurizing the power cylinders 5 via the pressure source 7. In this manner the test hanger is placed under tension (load), the applied magnitude of which is indirectly indicated with sufficient accuracy by the pressure gauge 7a.

The described apparatus may be regarded as a base structure with which, it is to be understood, by means of a further variation in the base frame and by the provision of further mounting attachments, complex load bearing members of any design may be load tested. Also, because of the versatility of the apparatus, its use is not limited to load bearing members, but it may find application in the testing of devices in other fields, such as roof trusses, conveyor devices and the like. It is to be further understood that instead of the fluid pressure means 5, 7, 10, any other force generating and force applying mechanism may be used to urge the carrier beam 6 to vary its distance from the base frame 1.

Figure 2:
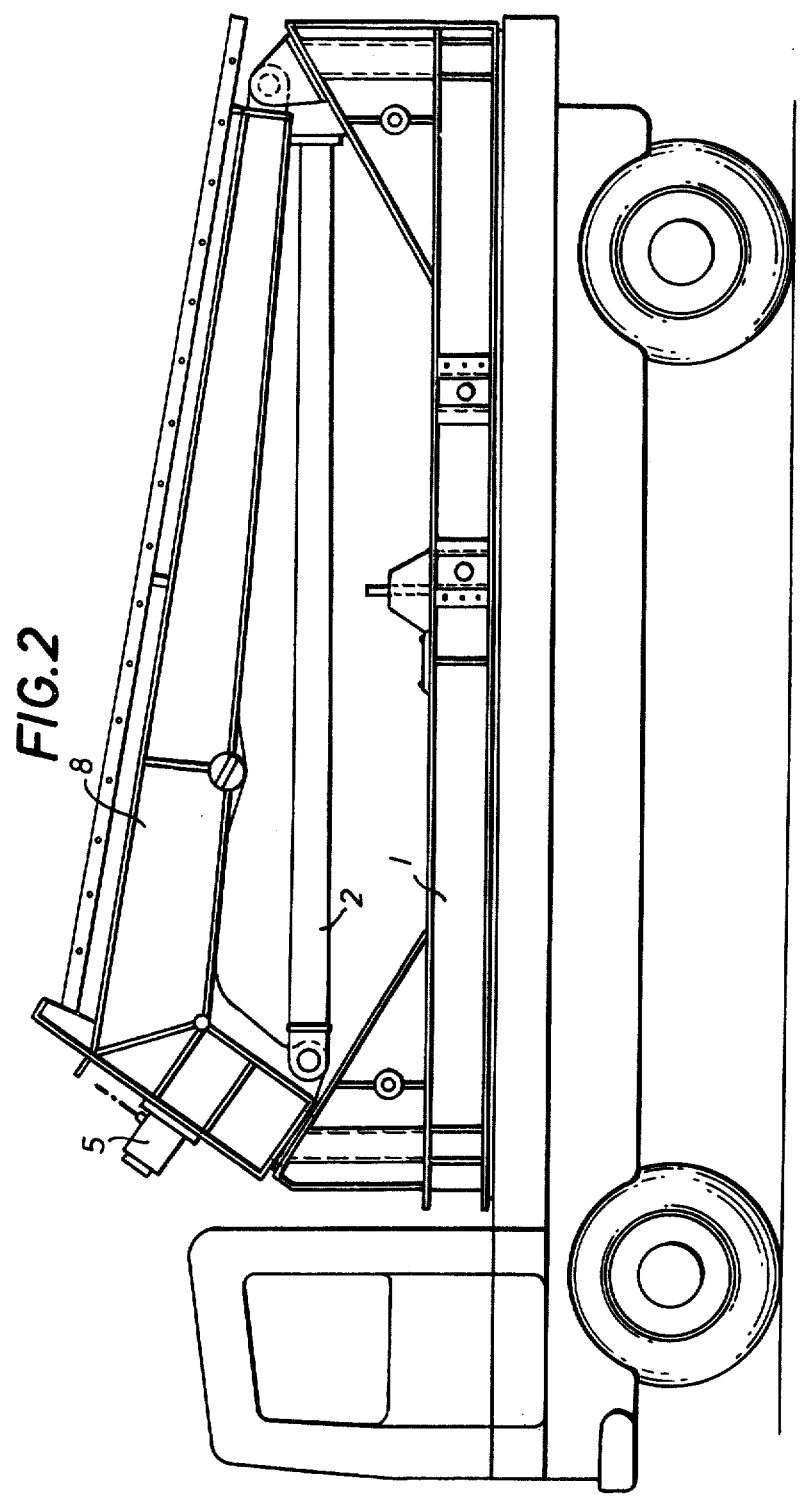
FIG. 2 is a side elevational view of the same embodiment mounted on a truck in a shipping condition.

Turning now to FIG. 2, the apparatus according to the invention is shown there on a truck in its collapsed, shipping condition into which it has been pivoted after removing the screw connections 13 and one of the pivots on each auxiliary support 11.

Figure 3:
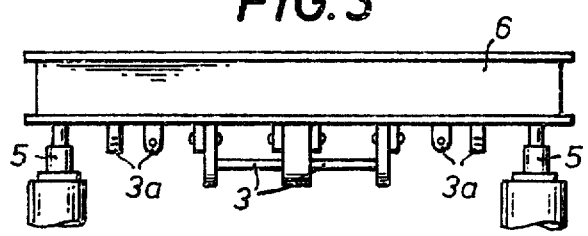
FIG. 3 shows a section view of the carrier beam with holding means for additional mounting attachments.

It is to be further understood and shown in FIG. 3 that for adapting the apparatus for various testing objects the beam 6 is provided with some holding means 3a which permit the addition of more attachments 3. It is thus seen that the disposition of the attachments 3 is variable on the beam 6.

It will be understood that the above description of the present invention is susceptible to various modifications, changes and adaptations, and the same are intended to be comprehended within the meaning and range of equivalents of the appended claims.

We claim:

1. An apparatus for the load testing of load bearing members, comprising in combination:
    a. a base frame having a variable outline;
    b. a plurality of spaced first mounting attachment means carried by said base frame for selectively receiving an end of diverse load bearing members to be tested;
    c. a bridge-like stand assembly connected to said base frame at a plurality of locations spaced from one another;
    d. a carrier beam displaceably secured to said stand assembly at a distance from said base frame at least at two spaced locations on said stand for movement with respect to said base frame to vary the distance between said beam and said base frame;
    e. a plurality of spaced second mounting attachment means carried by said beam for selectively receiving an end of diverse load bearing members to be tested;
    f. power means connected between said beam and said stand for urging said beam to change its distance from said base frame, whereby the load bearing test member secured to at least one of said first mounting attachment means and to at least one of said second mounting attachment means is placed under a test load; and
    g. means for setting the force exerted by said power means to obtain a determined test load.

2. An apparatus as defined in claim 1, said power means including fluid pressure-operated power cylinders constituting the sole support of said carrier beam on said stand assembly.

3. An apparatus as defined in claim 1, including auxiliary base frame components carrying additional first mounting attachment means and means for removably securing said auxiliary base frame components to said base frame to vary the outline thereof and to vary the number of said first mounting attachment means.

4. An apparatus as defined in claim 1, including means pivotally attaching one end of said stand assembly to said base frame whereby said apparatus is collapsible into an inoperative condition; said stand assembly including support bar means pivotally attached thereto at locations remote from the pivotal connection between said base frame and said stand; and means for releasably connecting said support bar means to said base frame for immobilizing said stand assembly with respect to said base frame in the operational condition of said apparatus.

5. An apparatus as defined in claim 1, further including means for varying the disposition of said second mounting attachment means on said carrier beam.

* * * * *